United States Patent [19]

Smith

[11] 4,424,546

[45] Jan. 3, 1984

[54] MINIATURE CENTRAL OFFICE SURGE PROTECTORS

[75] Inventor: Thomas J. Smith, Bay Shore, N.Y.

[73] Assignee: TII Industries Inc., Copiagur, N.Y.

[21] Appl. No.: 381,360

[22] Filed: May 24, 1982

[51] Int. Cl.³ ................................................ H02H 9/04

[52] U.S. Cl. ...................................... 361/119; 337/32; 337/34

[58] Field of Search ............... 361/117, 119, 120, 124; 337/28, 31-34

[56] References Cited

U.S. PATENT DOCUMENTS

| | | | |
|---|---|---|---|
| 3,573,695 | 4/1971 | Geyer et al. | 337/32 X |
| 4,262,317 | 4/1981 | Baumbach | 361/119 X |
| 4,303,959 | 12/1981 | Roberts et al. | 361/119 X |
| 4,307,430 | 12/1981 | Montalto et al. | 361/119 X |

*Primary Examiner*—Harry E. Moose, Jr.
*Attorney, Agent, or Firm*—Martin Sachs

[57] ABSTRACT

A miniature surge protector for use in telephone central offices, or the like which are provided with terminal blocks for communication lines includes an in-line overcurrent coil arrangement which grounds each communication line if an overcurrent flows therethrough and is additionally provided with a gas tube surge protector and an auxiliary air gap disposed across a pair of communication lines and a common ground terminal, thus providing overvoltage and overcurrent protection to a pair of telephone communication lines.

11 Claims, 5 Drawing Figures

MINIATURE CENTRAL OFFICE SURGE PROTECTORS

BACKGROUND OF THE INVENTION

1. Field of the Invention

The present invention relates to surge protection devices and, in particular, relates to a miniature surge protector for use on a telephone central office communication line terminal block, or the like, to provide overvoltage and overcurrent protection.

2. Discussion of the Relevant Art

Overvoltage and overcurrent surge protectors for communication lines are abundant in the art and they are generally directed to protecting instruments at the point of installation, e.g. home or business. Typical of these devices are U.S. Pat. Nos. 4,023,071 issued to G. W. Fussell on May 10, 1977; 3,890,543 issued to G. D. Jonassen on June 17, 1975; 3,423,635 issued to J. E. Moe on Jan. 21, 1969; and 3,353,066 issued to A. A. DeSouza on Nov. 14, 1967. All of these devices are installed at the terminals of the equipment to be protected and are generally unsuitable for use at a telephone central office.

Typical of the terminal blocks used for connecting the telephone communication lines are those manufactured by Reliable Electric Company, Franklin Park, Ill., Model Number R713-1, 2, 3 or 4 or terminal blocks manufactured by TII Industries, Inc., Model Number TII 561/571 Series Building-Entry Protector Assemblies. These terminal blocks are utilized by telephone central office installations or at the entrance to buildings where a large number of telephone communication lines are provided. The terminal boards are adapted to receive protective modules such as Model Number 4AB, manufactured by Reliable Electric Company of Franklin Park, Ill., and are suitable for receiving the protector modules of the instant invention.

Earlier devices which were used at telephone central office installations either in connection with or proximate to central office terminal blocks which were utilized in the central office termination of communication lines require installation separate and apart from central office communication line terminal block and are large in size and since they were not directly mounted on the terminal blocks but remote therefrom, do not always provide adequate protection to the lines. The miniaturized devices mount directly to the terminal blocks and afford a higher degree of protection. However, in order to improve reliability, insure protection and utilize the module cover only as a dust cover and not to hold the components of the module together, further improvement is required.

The present apparatus is small in size, may be mounted upon the central office communication line terminal block, is readily removable therefrom should it be necessary to replace a defective unit, provides for ready replacement of the gas tube voltage surge protector and additionally includes overcurrent protection for the communication lines. When an overcurrent occurs on the communication line or if an overvoltage transient damages the overvoltage surge protector and/or its associated air gap protection the present surge protector provides a positive shorting connection between the communication line and ground.

Therefore, it is an object of the present invention to provide an economical, miniature central office surge protector capable of being used with central office communication line terminal blocks.

It is another object of the present invention to provide a miniature central office surge protector that protects for excessive line currents as well as overvoltage surges.

It is yet a further object of the present invention to provide a miniature surge protector that utilizes a leaf spring to provide a positive ground contact when a communication line experiences an overcurrent condition.

It is yet another object of the present invention to provide a miniature surge protector suitable for use on central office terminal blocks wherein the overvoltage gas tube protector device may be readily removed and replaced.

SUMMARY OF THE INVENTION

A miniature surge arrester, according to the principles of the present invention, for use by a telephone central office having a telephone terminal block with two pairs of in-line open terminal receptacles and a ground terminal receptacle with one pair of the in-line terminals being serially disposed in each of a pair of communication lines, comprises an insulated base adapted to be received by the central office terminal block. The base is provided with a plurality of extending terminals being adapted to be received by the central office terminal receptacles and in intimate electrical conductive contact therewith. A heat coil is serially connected between a pair of the extending terminals in electrical contact with each of the pair of open terminal receptacles. The bobbin of the heat coil is provided with an electrical contact normally maintained in a first position and movable to a second position responsive to a current overload and passing through the heat coil. The heat coil in its second position provides an electrical conductive path from one of the pair of communication lines to an extending terminal in electrical conductive contact with the ground receptacle. A gas tube breakover protection device, has a pair of line electrodes and a ground electrode. The ground electrode is connected to an extending terminal in electrical conductive contact with the ground receptacle. One of the pair of tube line electrodes is connected to an extending terminal and in electrical conductive contact with one of the terminal receptacles of each of the respective communication lines.

The foregoing and other objects and advantages will appear from the description to follow. In the description, reference is made to the accompanying drawing which forms a part hereof, and in which is shown, by way of illustration a specific embodiment to which the invention may be practiced. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawing in which.

DESCRIPTION OF THE PREFERRED EMBODIMENT

Figure 1:
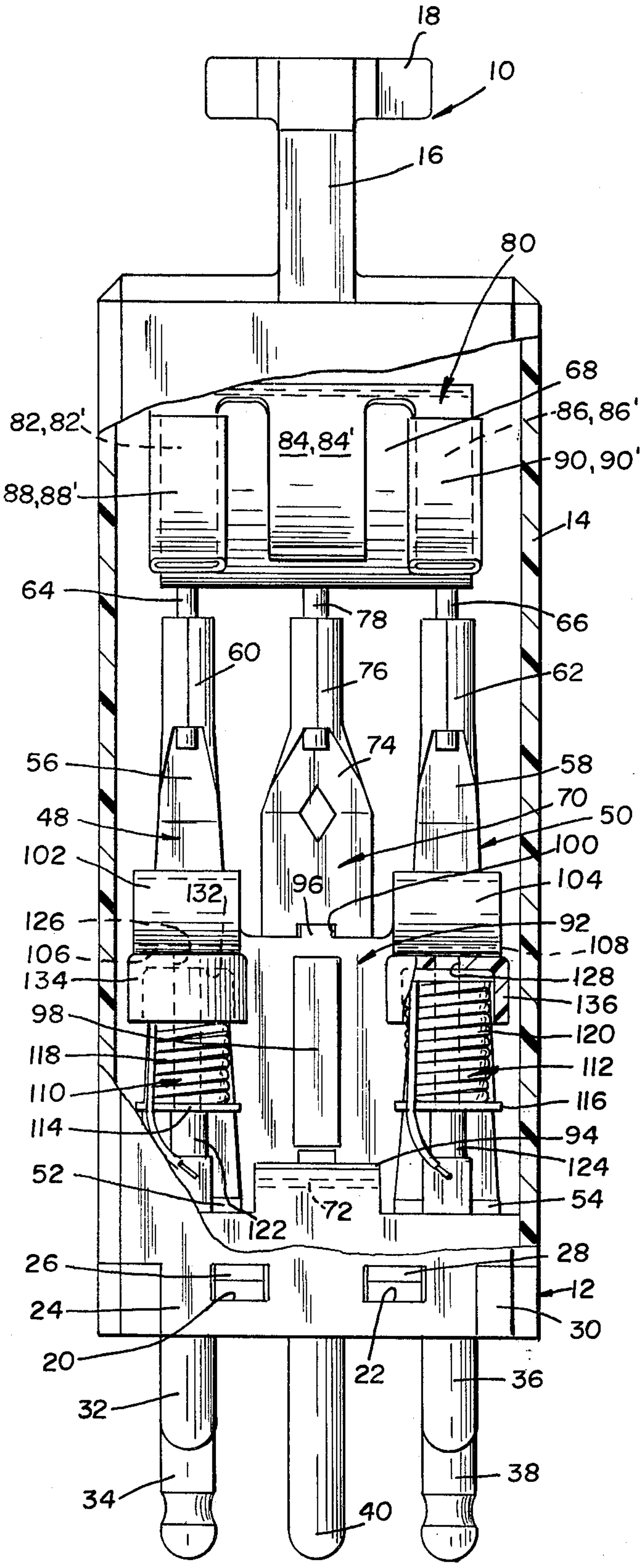
FIG. 1 is an enlarged front view, partially broken away, of a minature central office surge protector, according to the principles of the instant invention.

Referring now to the figures, and in particular, to FIGS. 1, 2, 3, and 4 wherein is shown a miniature central office surge protector 10 which includes a base portion 12 and a cover 14. The cover 14 is preferably provided with an upwardly extending portion 16 having a horizontal portion 18 at the distal end thereof ideally suitable for engagement by the fingers of a service technician who may remove the entire surge protector 10 from its mounted position in a telephone central office terminal block, not shown, by exerting outward pressure thereon. Alternatively, a tool, not shown, may be inserted under the horizontal portion 18 and may readily be used to remove the surge protector 10 from its mounted position in the terminal block. The cover 14 is preferably fabricated from an insulating material such as a thermoplastic, thermoset, etc., e.g. hard rubber, phenolic, Bakelite, etc., and is preferably provided with a pair of rectangular-shaped apertures 20 and 22 provided at the lower distal end of the cover 14 which are adapted to cooperate with and engage a pair of protrusions 26 and 28 provided on the front and rear of the insulated base 30, which is preferably fabricated of the same material utilized for the cover 14. The overall size of the surge protector is preferably approximately $2\frac{1}{2}$ inches$\times\frac{3}{4}$ inches$\times\frac{1}{2}$ inch (6.4 cm.$\times$2 cm.$\times$1.3 cm.).

Figure 5:
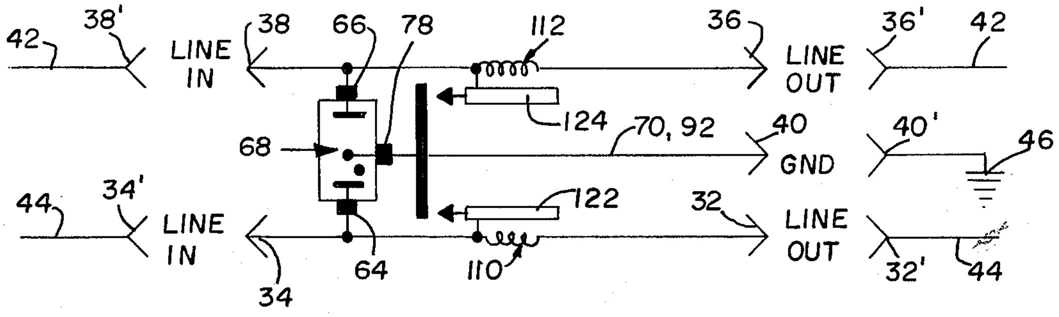
FIG. 5 is an electrical circuit diagram disclosing the circuit arrangement of the components of the instant invention.

The insulated base 30 is provided with a plurality of downwardly extending pins or terminals 32, 34, 36, 38 and 40 which are adapted to be received by receptacles provided in the central office telephone terminal block utilized for the termination of pairs of communication lines 42 or 44 (FIG. 5). The pins or terminals 32, 34, 36, 38 and 40 are made of metal and continue the electrical conductive path from each of the receptacles provided in the terminal block into the surge protector 10 and are inserted in the base 30, in a conventional manner, which may include an ultrasonic technique. The central office terminal block is provided with two pairs of in-line terminals having an open circuit therebetween, as shown in FIG. 5. The central office receptacles 32′, 34′, 36′, and 38′, are adapted to receive the respective terminals identified as 32, 34, 36 and 38. Ground terminal 40 is received by the ground receptacle 40′ provided on the central office terminal block. Receptacles 36′ and 38′ are defined as one pair of in-line terminals since they are serially disposed in a communication line 42 which remains open unless the surge protector 10 has been plugged into the terminal block. Communication line 44 similarly remains open unless the surge protector 10 has been plugged into the terminal block. Connection to earth ground 46 is made through receptacle 40′ and provides electrical conductive contact through terminal 40 when surge protector 10 is plugged into the terminal block. A more detailed description of the electrical circuit arrangement will be discussed hereinafter.

A pair of C-shaped brackets 48 and 50 have their lower portions 52 and 54, respectively, affixed to terminals 34 and 38, respectively, by conventional means, thereby continuing the electrically conductive path. The upper portions of the C-shaped brackets 48 and 50, respectively, are provided with a vertically disposed, hollow, cylindrically-shaped distal end 60 and 62, respectively, which are adapted to receive and cooperate with the extending pins or line terminals (electrodes) 64 and 66 provided on the gas tube 68.

Figure 3:
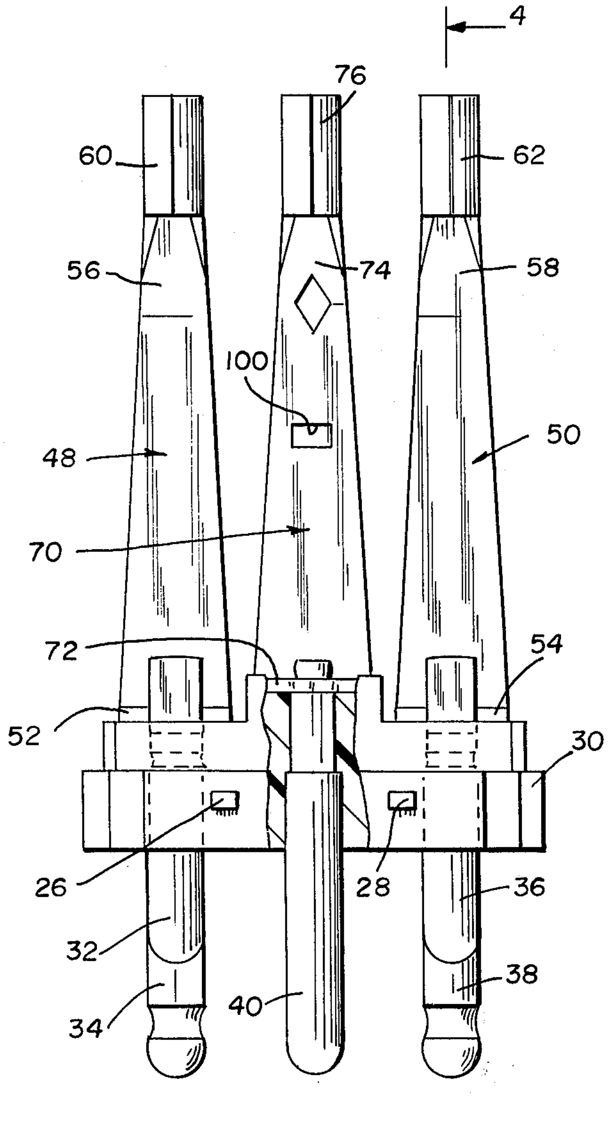
FIG. 3 is a front view in elevation of the base portion of the miniature surge protector shown in FIG. 1.
Figure 4:
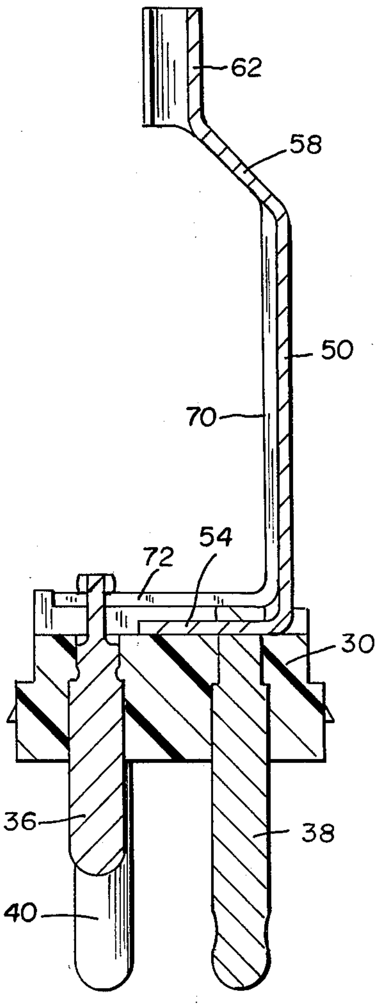
FIG. 4 is a cross-sectional view taken along the line 4—4 of FIG. 3.

An additional C-shaped bracket 70 has its lower portion 72 in contact with and affixed to terminal 40 in a conventional manner, (see FIGS. 3 and 4). The upper portion 74 of C-shaped bracket 70 is also provided with a hollow, vertically disposed, cylindrically-shaped distal end 76 which is adapted to receive pin or terminal 78 provided as the ground electrode on gas tube 68. A metallic clip 80 is provided with a plurality of fingers 82, 82′, 84, 84′, 86, and 86′, which are adapted to encompass the gas tube 68. Fingers 84 and 84′ are in electrical conductive contact with terminal 78 provided on the gas tube 68. Insulation sleeves or tubing 88 and 88′ are placed over fingers 82 and 82′ thereby preventing fingers 82 and 82′ from coming into electrically conductive contact with terminal 64 provided on the gas tube 68. In a like manner, sleeves or tubing 90 and 90′ are placed over fingers 86 and 86′ to prevent them from coming into electrical conductive contact with electrode terminal 66 provided on gas tube 68. Thus, a back-up or auxiliary air gap is provided between the ground terminal 78 and the electrode terminals 64 or 66, via the sleeving or tubing 88, 88′, and 90, 90′ which may be fabricated from Teflon, shrink-sleeving, or any other suitable insulating material.

Figure 2:
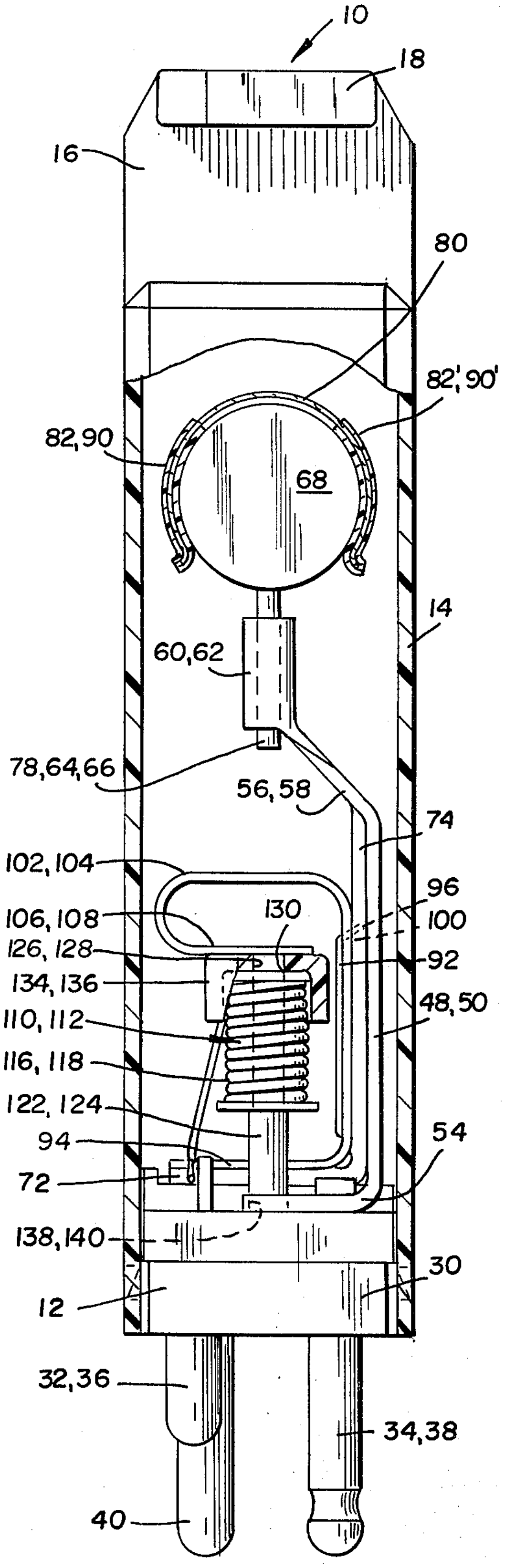
FIG. 2 is a side view in elevation of a miniature surge protector shown in FIG. 1.

A leaf spring 92, generally shaped as a figure "9" in a side view and generally shaped as a figure "T" in a front view, preferably has its lower portion 94 affixed to and in electrical conductive contact with terminal 40 in the same manner as C-shaped bracket 70. A tab 96 is provided on the centrally disposed upper distal end of the vertical portion 98 of the leaf spring 92 which cooperates with and is received by a rectangular-shaped aperture 100 provided in the upper portion 74 of bracket 70, thereby holding leaf spring 92 rigidly in position. Extending outwardly from the vertical portion 98 of leaf spring 92 are two oval shaped arms 102 and 104. Oval arms 102 and 104 extend in a forward direction and then curl back upon themselves forming the upper portion of a figure "9" when observing the leaf spring 92 in a side view, as seen in FIG. 2. The lower portion 106 and 108 of arms 102 and 104, respectively, are disposed essentially in a horizontal plane.

A pair of heat coils 110 and 112 include metallic bobbins 114 and 116 which have insulated resistance wire 118 and 120 affixed on one end thereof (welded) and wound as a coil with the remaining end hanging free to be attached, preferably by spot welding to the upper distal end of terminals 32 and 36, respectively. Centrally disposed within the hollow bobbins 114 and 116 are metallic contacts 122 and 124, respectively, which are soldered into place within the apertures 126 and 128 provided in the bobbins 114 and 116, respectively. The position of contacts 122 and 124 is preferably kept below the end surfaces 130 and 132 of bobbins 114 and 116, respectively. Insulating covers 134 and 136 are provided over the top of both bobbins 114 and 116, respectively, in order to prevent the contacts 122 and 124 from coming into electrical conductive contact with the lower portions 106 and 108 of leaf spring 92. The lower portions of contacts 122 and 124 are assembled into apertures 138 and 140 provided in the lower portions 52 and 54, respectively, of brackets 48 and 50, thereby being in electrical conductive contact therewith.

In the configuration disclosed, the gas tube 68 may be removably inserted into the cylindrically-shaped portions 60, 62, and 76 of brackets 48, 50, and 70, respectively, or they may be welded, or crimped therein for a more permanent type of assembly. This arrangement may be utilized if there is a very little need to replace the gas tube with any regularity.

Referring now to FIG. 5, which discloses an electrical circuit diagram of the component arrangement set forth in FIGS. 1 and 2. The communications lines to be protected are shown by the numerals 42 and 44, and the receptacles provided on the central office terminal block are represented by the numeral 32', 34', 36', 38' and 40'. The male pins or terminals appearing on the surge protector 10 are designated by the numerals 32, 34, 36, 38 and 40, and when the surge protector 10 is plugged into the terminal block, these terminals cooperate with the receptacles of similar designation continuing the electrical conductive continuity therethrough. Thus, terminals 36' and 38' would form an open circuit or break in the communication line designated as 42. Likewise, terminals 32' and 34' occurring on the central office communication terminal block would provide an open circuit for communication line 44 when the surge protector 10 is removed from the terminal block. Terminal 32 of the surge protector 10 is connected to terminal 34, via heat coil 110 and terminal 36 is connected to terminal 38, via heat coil 112. Terminal 64 of gas tube 68 is connected to terminal 34, via conductive bracket 48. Terminal 66 of gas tube 68 is connected to terminal 38 by means of bracket 50. Terminal 78 of gas tube 68 is connected to ground terminal 40, via bracket 70 with leaf spring 92 being superimposed thereon.

In operation, with no overcurrent surges or transient voltages present, the contacts 122 and 124 do not make electrical conductive contact with the bottom portion 106 and 108 of the arms 102 and 104, respectively, of leaf spring 92. The surge protector 10, when plugged into the central office terminal block, merely provides the necessary continuity between lines 42 and 44. The coils 110 and 112 are preferably made with resistance wire to supply sufficient heat during an overcurrent to cause the heat coils 110 and 112 to move along the contacts 122 and 124 to a second position permitting the contacts to move through apertures 126 and 128, and come into electrical conductive contact with the lower portions 106 and 108 of the arms 102 and 104, respectively, of leaf spring 92. An overcurrent surge need not occur on both lines simultaneously for this to happen since an overcurrent on either one of communication lines 42 or 44 will cause the low temperature solder holding the bobbins 114 or 116 of heat coils 114 and 116 to move along contacts 122 or 124 in place, in a first position, to melt because of the heat generated by the current flowing through the resistance wire of coils 114 or 116. With the pressure exerted by the leaf spring 102 or 104 on the covers 134 or 136, coils 110 or 112, respectively, will be urged in a downward direction permitting contacts 122 or 124 to enter apertures 126 or 128 provided in the bobbin covers 134 or 136, thus permitting the contacts to come into electrical conductive contact with the arms 102 or 104 of leaf spring 92, providing a short to ground on either one of the communication lines that had an overcurrent appear thereon. Similarly, should an overvoltage appear on communication lines 42 and/or 44, gas tube 68 will breakover between electrodes 78 and/or 64 and 66 to carry overvoltage surge currents therethrough to ground via terminal 40, and receptacle 40' to earth ground 46. Depending on which side of the line the overvoltage appeared on, the gas tube may cause excessive current to flow in coils 110 and 112 and a permanent short may be left on the communication line to ground because of additional, excessive current flowing in the line. The central office test operator can readily determine which line has a short thereon and will dispatch a repair technician to remove the now defective surge arrester 10 from the terminal block replacing it with a new operable unit. If the tube 68 fails to operate and an excessive transient voltage appars thereacross, fail-short clip 80 will provide a back-up air gap. Moreover, if the tube should overheat because of excessive transient currents caused by a relatively long voltage transient, the insulation sleeves 88, 88' and/or 90, 90' will melt and fail-short clip will short both line electrodes 64 and 66 to the ground electrode 78. If it is deemed economical, repairs may be made on the removed unit or a new unit may be installed with a minimum of effort by a service technician.

Hereinbefore has been disclosed a relatively simple, reliable, inexpensive, miniature, surge arrester ideally suited for use on central office terminal blocks or the like adapted to reveive them. The instant embodiment is readily replaceable and, once having protected against an overcurrent or overvoltage surge, may be readily replaced. It will be understood that various changes in the details, materials, arrangement of parts, and operating conditions which have been herein described and illustrated in order to explain the nature of the invention, may be made by those skilled in the art within the principles and scope of the instant invention.

Having thus set forth the nature of the invention, what is claimed is:

1. A miniature surge protector for central office use, or the like, comprising:

(a) an insulated base means adapted to be received by a central office terminal block having two pairs of in-line open terminal receptacles, one pair of terminal receptacles being disposed in each of a pair of communication lines, and a ground terminal receptacle, said base means including:

(i) two pairs of extending terminals adapted to be received by said receptacles of said central office terminal block providing electrical conductive contact therebetween, (ii) a pair of first bracket means, one of said bracket means being affixed to one end of one of each pair of said extending terminals and extending upwardly therefrom, (iii) an extending ground terminal adapted to be received by said ground receptacle of said central office terminal block, (iv) a second bracket means, said second bracket means being affixed to one end of said extending ground terminal and extending upwardly therefrom;

(b) a pair of heat coils, one of said heat coils being affixed to each of said bracket means proximate each of said one extending terminals and in electrical conductive contact therewith, the other end of said heat coils being conductively connected to the other of said pair of extending terminals proximate thereto, said heat coil being provided with a centrally disposed movable electrical contact in electrical conductive contact with one end of said coil and maintained in a first position by said heat coil, said heat coil being movable to a second position responsive to a current overload through said coil;

(c) insulating cover means disposed on the free end of said heating coils, said cover means being provided with a centrally disposed aperture adapted to permit passage of said heat coil movable contact therethrough;

(d) spring means mounted to said second bracket means, in electrical conductive contact therewith, and having a pair of extending arms, said extending arms being in mechanical contact with each said insulating cover means urging each said soil towards said second position, said heat coil in said second position permitting said contact to extend through said cover means aperture and into electrical conductive contact with said spring means.

2. A miniature surge protector for central office use, or the like, according to claim 1 further including gas tube breakover protection means having a pair of line electrodes and a ground electrode, said first and second bracket means being provided with mounting means at their free distal ends, said second bracket distal end being adapted to receive said gas tube ground electrode and said first bracket distal end being adapted to receive one of said gas tube line electrodes.

3. A miniature surge protector for central office use, or the like, according to claim 2 further including clip means, said clip means extending across said pair of line electrodes, in conductive contact therewith, and being in intimate conductive contact with said tube ground electrode and being prevented from being in intimate electrical contact with said pair of line electrodes by an insulator means being disposed therebetween.

4. A miniature surge protector for central office use, or the like, according to claim 1 wherein said second spring means is removably affixed to said second bracket means.

5. A miniature surge protector for central office use according to claim 1 wherein said spring means arms are leaf springs.

6. A miniature surge protector for central office use according to claim 1 wherein said second bracket means is disposed between said pair of first bracket means.

7. A miniature surge protector for central office use according to claims 1, 2, 3, 4, 5 or 6 further including cover means encompassing said gas tube means, said first and second bracket means, said cover means being removably affixed to said base means.

8. A miniature surge arrestor for use by a telephone central office having a telephone terminal block with two pairs of in-line open terminal receptacles and a ground terminal receptacle, one pair of said in-line terminals being serially disposed in each of a pair of communication lines, comprising:

(a) insulated base means adapted to be received by said central office terminal block, said base means being provided with a plurality of extending terminals each being adapted to be received by said central office terminal receptacles and in intimate electrical conductive contact therewith;

(b) means serially connected between a pair of said extending terminals in electrical contact with each said pair of open terminal receptacles, said means being provided with an electrical contact normally maintained in a first position and movable to a second position responsive to a current overload passing through said means, said means in said second position providing an electrical conductive path from one of said pair of communication lines to an extending terminal in electrical conductive contact with said ground receptacle; and (c) gas tube breakover protection means having a pair of line electrodes and a ground electrode, said ground electrode being connected to an extending terminal in electrical conductive contact with said ground receptacle, one said pair of said tube electrodes being connected to an extending terminal and in electrical conductive contact with one of said terminal receptacles of each said respective communication lines.

9. A miniature surge arrestor according to claim 8 wherein said means is a heat coil having a centrally disposed electrical contact said heat coil being movable from said first to said second position responsive to a current overload flowing through said coil, said movable contact being connected to one end of said coil.

10. A miniature surge arrestor according to claim 8 wherein said gas tube breakover protection means is readily removable and replaceable.

11. A miniature surge arrestor according to claims 8, 9, or 10 further including cover means encompassing said means and said gas tube means, said cover means being removably affixed to said base means.

* * * * *